United States Patent
Nash

(10) Patent No.: US 10,293,734 B2
(45) Date of Patent: May 21, 2019

(54) VEHICLE MOUNTED LOADING AND UNLOADING APPARATUS

(71) Applicant: James E. Zerbst, New Castle, WY (US)

(72) Inventor: Mark Nash, Rapid City, SD (US)

(73) Assignee: James E. Zerbst, New Castle, WY (US)

( * ) Notice: Subject to any disclaimer, the term of this patent is extended or adjusted under 35 U.S.C. 154(b) by 0 days.

(21) Appl. No.: 15/660,441

(22) Filed: Jul. 26, 2017

(65) Prior Publication Data

US 2019/0031074 A1    Jan. 31, 2019

(51) Int. Cl.
*B60P 1/32*    (2006.01)

(52) U.S. Cl.
CPC ...................... *B60P 1/32* (2013.01)

(58) Field of Classification Search
CPC ......... B60P 1/6454; B60P 3/1025; B60P 1/30; B60P 1/32; B60R 9/042
See application file for complete search history.

(56) References Cited

U.S. PATENT DOCUMENTS

| | | |
|---|---|---|
| 1,604,494 A | 10/1926 | Snyder |
| 2,354,337 A | 7/1944 | Smith |
| 2,708,047 A | 5/1955 | Deidle |
| 2,931,528 A * | 4/1960 | Mabry ............... B60P 3/1025 414/462 |
| 4,015,737 A | 4/1977 | Wright et al. |
| 5,203,668 A | 4/1993 | Marmur |
| 5,544,796 A * | 8/1996 | Dubach ............... B60R 9/042 224/310 |
| 5,846,045 A * | 12/1998 | Johnson ............... B60P 1/6454 414/462 |
| 6,520,393 B1 * | 2/2003 | Ferguson ............... B60R 9/042 224/310 |
| 7,226,266 B2 * | 6/2007 | Henderson ............ B60R 9/042 414/462 |
| 8,322,580 B1 * | 12/2012 | Hamilton ............. B60R 9/042 224/309 |
| 9,457,727 B2 * | 10/2016 | Hobbs ..................... B60R 9/06 |
| 2017/0274810 A1 * | 9/2017 | Zerbst ..................... B60P 1/32 |

* cited by examiner

*Primary Examiner* — Mark C Hageman
(74) *Attorney, Agent, or Firm* — Bacon & Thomas, PLLC

(57) ABSTRACT

A vehicle mounted loading and unloading apparatus is provided which has a stationary mounting rack removably attachable to a roof of a vehicle and a top rack that includes a container for storing cargo, such as bales of hay. A moving mechanism is provided to move the top rack relative to the mounting rack from a transporting position to a loading/unloading position in which the top rack is lowered behind the vehicle to facilitate loading cargo. The top rack is guided from the transporting position to a loading/unloading position by a track structure extending from the mounting rack, which cooperates with a bearing structure fixed to sides of the top rack. A movable shelf may be provided on the top rack for assisting with loading and unloading cargo. The shelf is slidable between a rear end of the top rack and a front end of the top rack for placing the cargo.

13 Claims, 9 Drawing Sheets

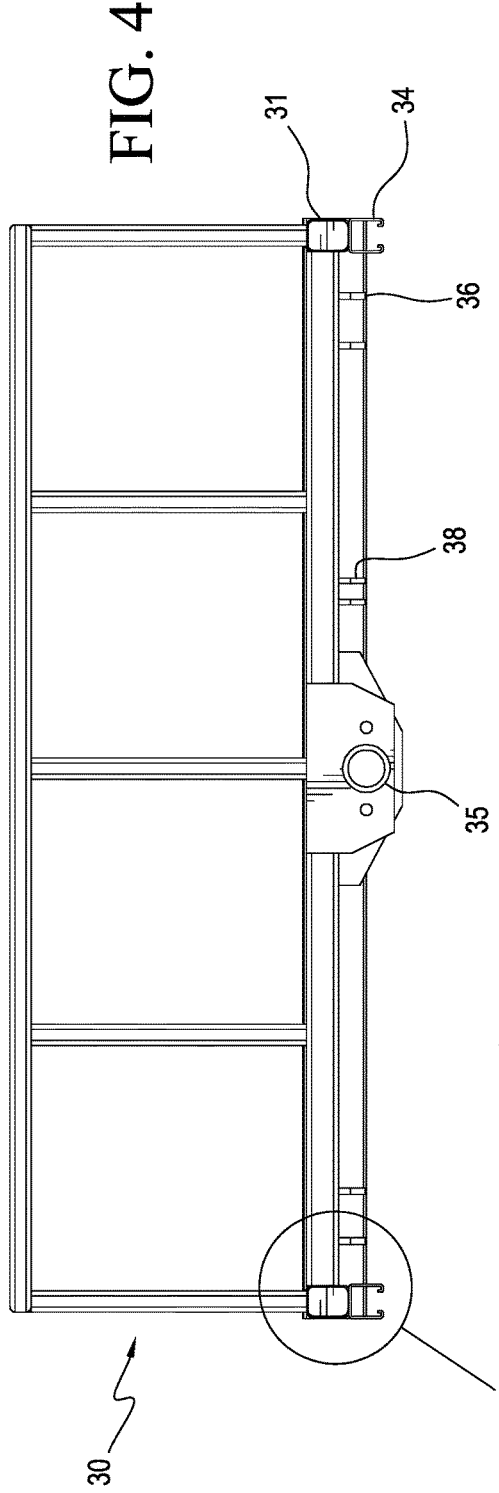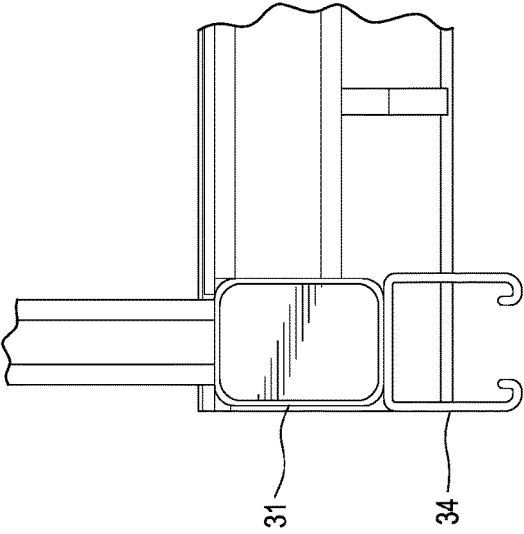

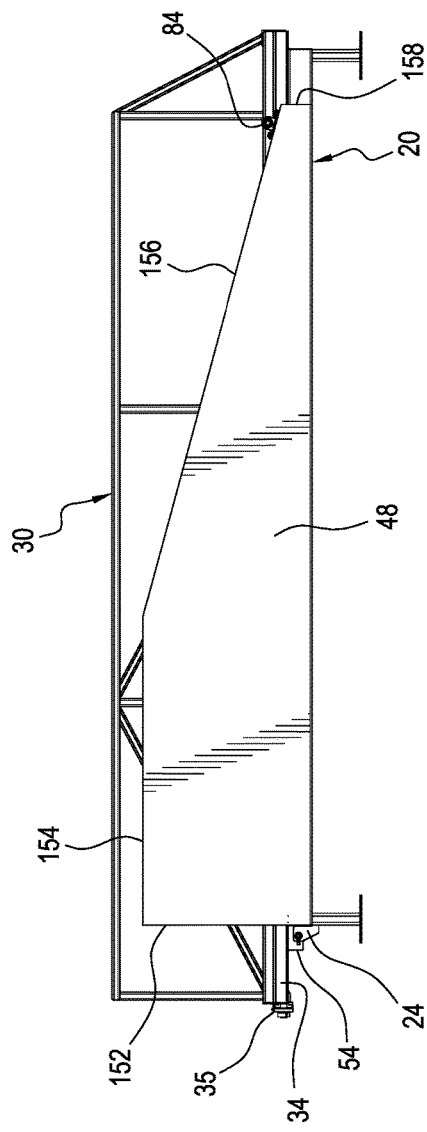
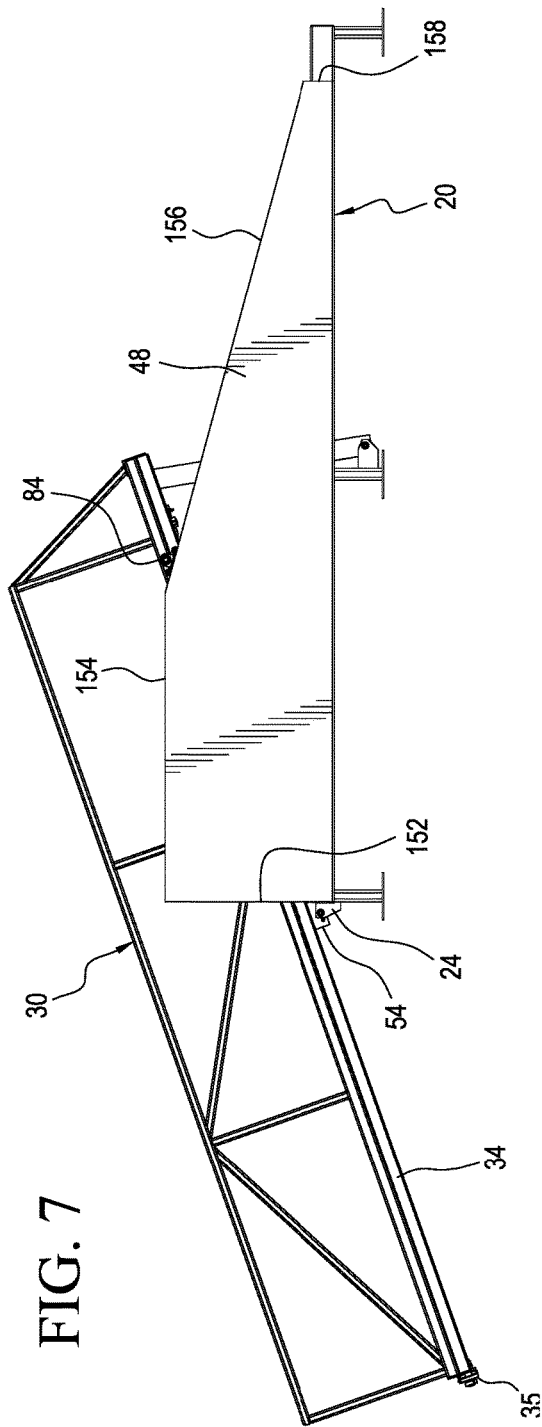
FIG. 6
FIG. 7

VEHICLE MOUNTED LOADING AND UNLOADING APPARATUS

FIELD OF THE INVENTION

The present invention relates generally to a cargo loader configured to load and unload hay and other bulk materials to a vehicle for transporting, and in particular to improvements to the cargo loader described in U.S. patent application Ser. No. 15/082,491, filed Mar. 28, 2016, and incorporated herein by reference.

The invention provides an improved guidance mechanism for the mounting rack. The improved guidance mechanism replaces the telescoping damping members described in U.S. patent application Ser. No. 15/082,491 with a pair of tracks extending from sides of a mounting rack, and corresponding bearings on the movable top rack, providing improved stability.

BACKGROUND

Hay is commonly baled for storage and transportation. However, baled hay is quite large and heavy, and thus difficult to handle. To solve this problem, conventional forklift devices are often used to load bales of hay onto the back of agricultural tractors or trucks. However, once these bales of hay are transported to their destination, they must then be unloaded using similar forklift equipment. This process can be very arduous and time consuming since it requires heavy machinery to both load and unload the hay.

It is therefore desirable to equip the transportation vehicle itself with a device that is capable of both loading and unloading large objects like the aforementioned bales of hay, so that use of standalone heavy machinery such as a forklift is not needed.

Such a device is disclosed in U.S. patent application Ser. No. 15/082,491. The device is removably attachable to a roof of the vehicle, and includes a top rack slidably and pivotally attached to a mounting rack. The top rack is driven from a position on top of the vehicle to a loading/unloading position by a motor-driven linear actuator. Guidance during movement of the top rack between the top of the vehicle and the loading/unloading position is provided by a pair of telescoping damping members located on opposite sides of the mounting rack. Each telescoping damping member has a first end pivotally connected to the mounting rack, and a second end pivotally connected to the top rack, and therefore the telescoping damping members and pivot connections bear a substantial portion of the load during movement of the top rack relative to the mounting rack.

The present invention seeks to provide increased stability by shifting the load from the pair of telescoping damping members and pivot connections to a fixed track, thereby distributing the loading forces over an extended and more stable structure, reducing wear and providing increased safety.

SUMMARY

A vehicle mounted cargo rack includes a top rack slidably and pivotally secured to a mounting rack. The mounting rack is removably attachable to the roof of the vehicle, while the top rack is movable secured to the mounting rack by a sliding pivot and guided by guide tracks and bearings between a transporting position in which the top rack is situated on top of the vehicle to a loading/unloading position in which one end of the top rack has been lowered to a position at which cargo can be placed on the top rack a track and bearing system.

In an exemplary embodiment, the rack and bearing system of the invention includes a pair of fixed guide tracks extending along sides of the mounting rack attached to the top of the vehicle, and bearings on two sides of the top rack. When the top rack is in the transporting position, each bearings is located at a portion of the track that is closest to the front of the vehicle (when the top racket is loaded from the rear of the vehicle). The tracks have a partially trapezoidal shape having a linear lower edge that extends along a top of the vehicle, two perpendicular side edges of differing lengths, and a guide edge at the top of each track that includes an inclined section that slopes upwardly from the front side edge of the track towards the rear and extends more than half way along the length of the track, and a rear section that extends from the inclined section to the rear side edge of the track, and is generally parallel to the lower edge of the track. The guide edge of the track includes a bearing-retaining structure the causes the bearing to follow the guide edge as the top rack is moved rearwardly from the transporting position to the loading/unloading position, and forwardly from the loading/unloading position to the transporting position.

In the exemplary embodiment, the top rack is driven from the transporting position to the loading/unloading position by an electric motor driven screw rod and follower arrangement of the type disclosed in U.S. patent application Ser. No. 15/082,491, although is it also within the scope of the invention for the top rack to be driven by other driving arrangements, such as a rack and pinion, winch, or pneumatic or hydraulic lift system. The follower may be a threaded collar that is pivotally secured to a rear end of the mounting rack and configured to guide the elongated screw rod as it is turned by the driving device. The elongated screw rod moves through the threaded collar as it is turned by the driving device during operation, such that the top rack correspondingly slides along the mounting rack in a rearward direction. As the bearings follow the inclined section of the top edge of the track during rearward movement, the top rack pivotally separates from the mounting rack as the sliding pivot also moves rearwardly, causing the top rack to swing from a horizontal position on top of the vehicle to the loading/unloading position, in which the top rack is in a slanted position relative to the rear of the vehicle. This movement is reversed upon loading of cargo onto the rack.

The weight of a portion of the top rack overhanging beyond the rear end of the mounting rack causes gravitational forces to assist in rotation the top rack away from the mounting rack, thus swinging the top rack behind the vehicle, while stability is maintained by the bearings and track structure.

Optionally, the movable shelf unit described in U.S. patent application Ser. No. 15/082,491 may also be provided on the top rack for assisting with loading and unloading cargo, the shelf unit having a shelf frame adapted to slide between a rear end of the top rack and a front end of the top rack along a pair of shelf guides provided on each lateral side of top rack for. Rollers provided on opposing lateral sides of the shelf frame roll along the corresponding first and second shelf guides for slidably moving the shelf frame along the top rack. A support bar may be attached to the rear end of the top rack by at least one mounting bracket, and at least one pulley fixed on the support bar for guiding a cable secured to a corresponding hook fixed on the rear end of the shelf frame for selectively pulling the shelf frame toward the rear end of the top rack.

BRIEF DESCRIPTION OF THE DRAWINGS

Various advantages, features and functions of the present invention will become readily apparent and better understood in view of the following description and accompanying drawings. The following description is not intended to limit the scope of the present invention, but instead merely provides exemplary embodiments for ease of understanding.

FIG. 4 is a rear elevation view of the top rack shown in FIG. 3.

FIG. 5 is an enlarged view of a corner portion of the top rack of FIG. 4.

FIG. 6 is a side elevation view of the cargo loader according to FIG. 1 in a transporting position.

FIG. 7 is a side elevation view of the cargo loader according to FIG. 1 in an intermediate position.

Figure 1:
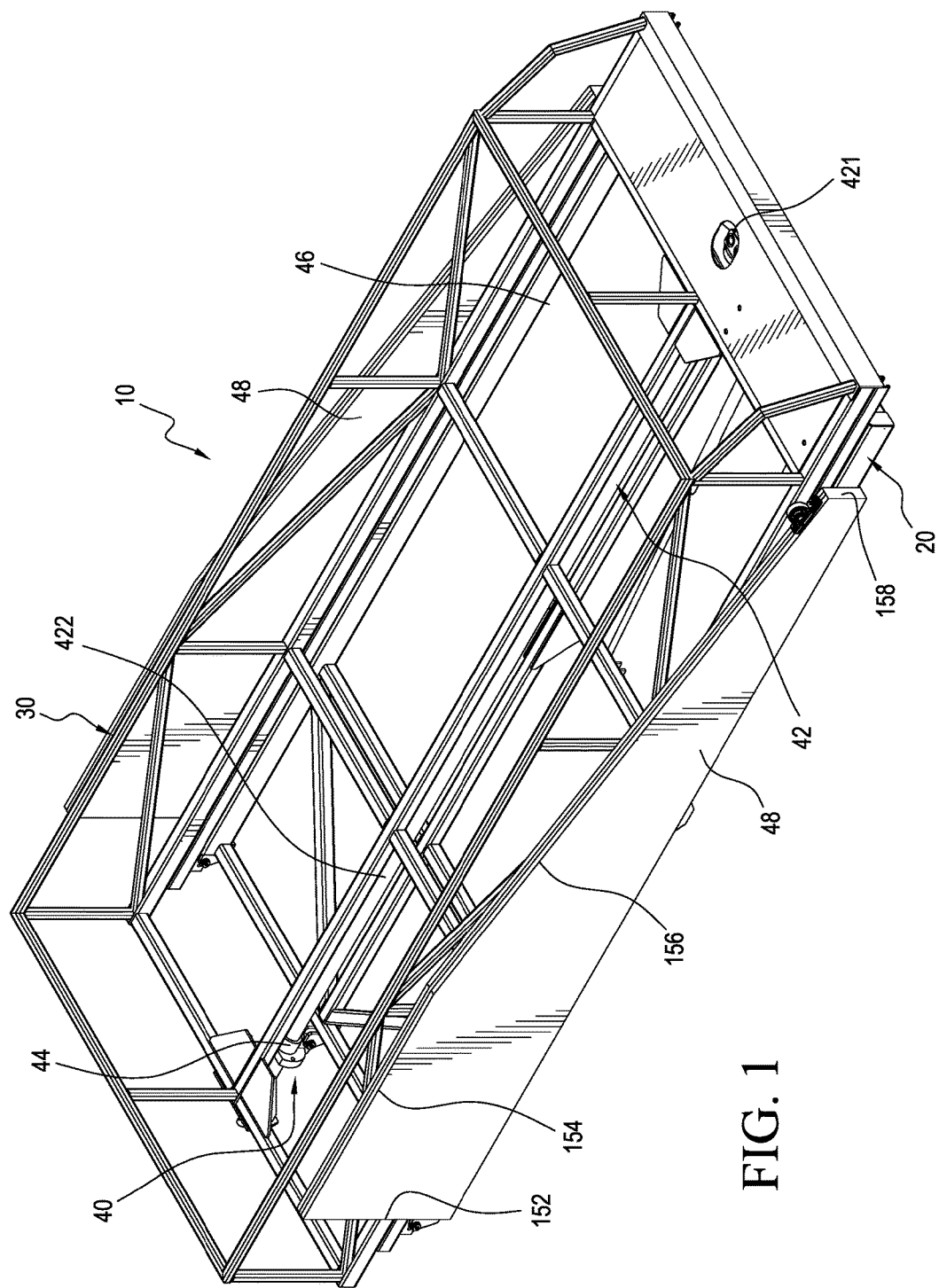
FIG. 1 is a perspective view of a cargo loader according to the present invention.

It should be noted that the drawing figures are not necessarily drawn to scale, but instead are drawn to provide a better understanding of the components thereof, and are not intended to be limiting in scope, but rather to provide exemplary illustrations. It should further be noted that the figures illustrate exemplary configurations of the present invention, and in no way limit the structures or configurations thereof according to the present disclosure.

DETAILED DESCRIPTION

The present invention is directed to a vehicle mounted apparatus for loading and unloading cargo, such as bales of hay and other bulk materials. Referring to FIG. 1, a cargo loader 10 comprises a mounting rack 20 configured to be removably secured to a vehicle, and a top rack 30 configured to be movably connected to the mounting rack. In particular, the top rack 30 is both slidably and pivotally connected to the mounting rack 20 and movable from a transporting position, in which the top rack 30 and any cargo are on top of the vehicle, and a loading/unloading position, in which the rear-facing side of the top rack has been moved rearwardly and the top rack pivoted so that it extends to the ground behind the vehicle, in order to enable loading and unloading. A track structures 48 extending upwardly from sides of the mounting rack 20 cooperate with bearings 84 extending laterally from sides of the top rack 30 to guide the top rack 30 as it is moved from the top position to the loading/unloading position and back. The cargo loader further comprises moving mechanism 40 configured to move the top rack 30 relative to the mounting rack 20 for moving the cargo loader between the loading/unloading/unloading position and a transporting position.

Figure 8:
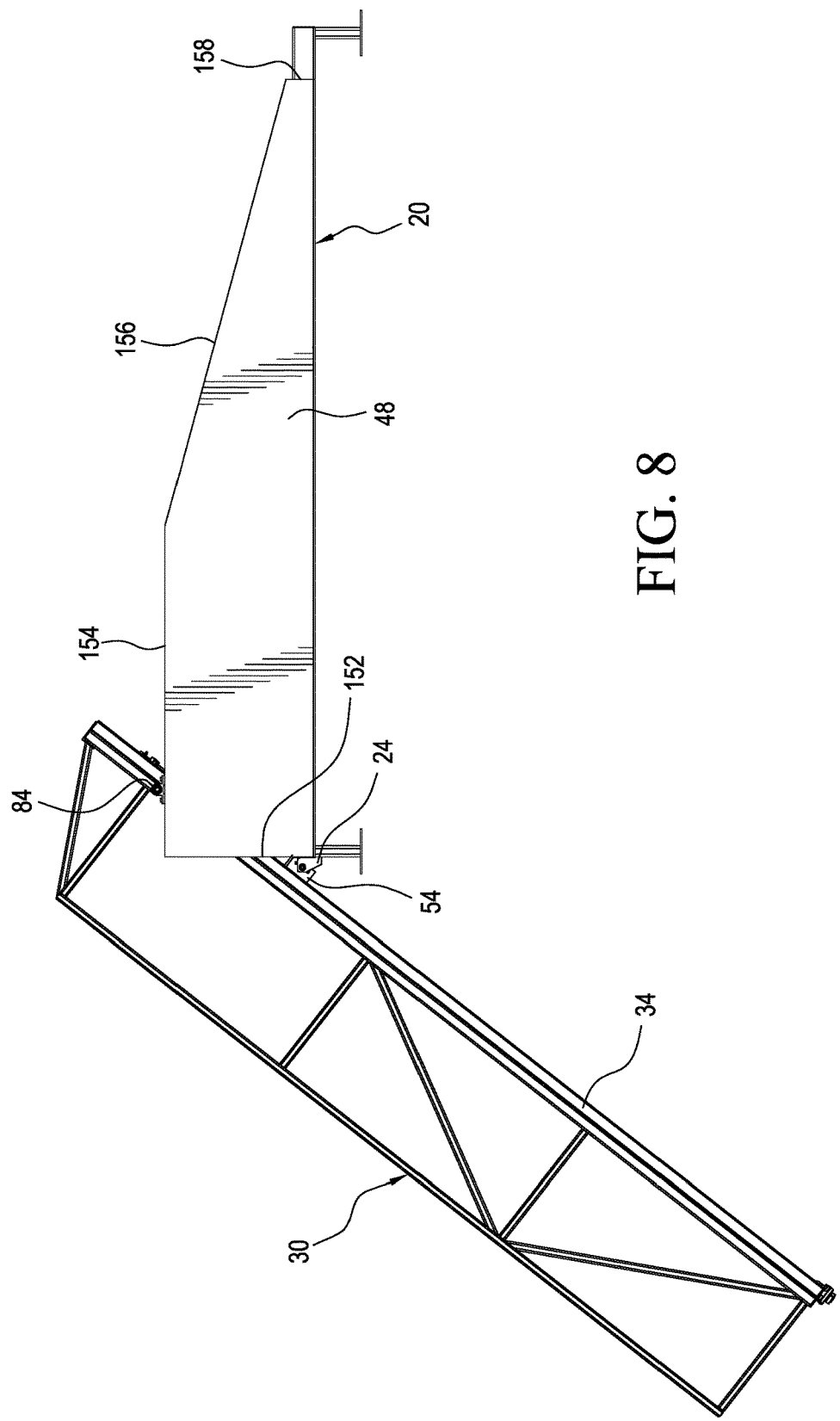
FIG. 8 is a side elevation view of the cargo loader according to FIG. 1 in a loading/unloading/unloading position.

As shown in FIG. 1, and also in FIGS. 6-8, each track structure 148 has a generally trapezoidal shape with a bottom edge affixed to the mounting rack 20, a rear edge 152 extending transversely from the bottom edge, a front edge 158 also extending transversely from the bottom edge and shorter than the rear edge 152, an inclined edge 156 extending from the front edge 158 rearwardly towards the rear edge 152, and a horizontal top edge 154 extending between the inclined edge 156 and the rear edge 152. Most of the top side of the track structure 148 is occupied by the inclined edge 156, with the horizontal top edge providing a stable platform for supporting the bearing 184 in the loading/unloading position during loading and unloading. It will be appreciated that the exact geometry of the horizontal top edge 154 and inclined edge 156 may be varied to achieve any desired guide path, and as necessary to account for dimensions of the mounting rack 20, the top rack 30, and the height of the vehicle (not shown). In addition, it is to be understood that the position of the rack on the vehicle could possibly be reversed, so that the loading/unloading occurs at the front of the vehicle.

Figure 1B:
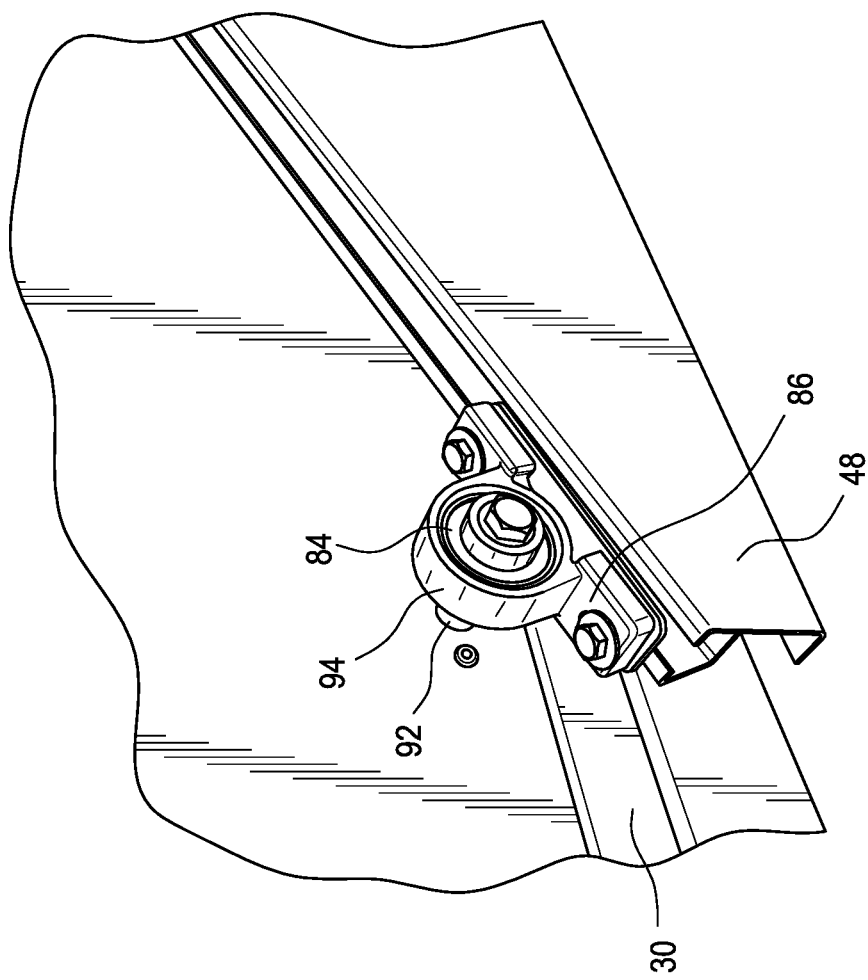
FIG. 1B is a perspective view of the bearing structure illustrated in FIG. 1A.
Figure 1A:
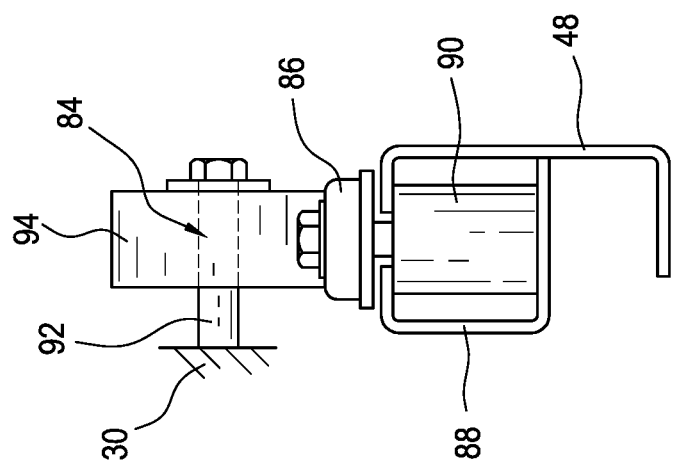
FIG. 1A is an end view showing details of a bearing structure that may utilized in the embodiment of FIG. 1.

As shown in FIGS. 1A and 1B, the bearing 84 includes a shaft 92 fixed to the top rack 30 and a sleeve 94 fixed to a housing 94 of the bearing, the shaft 92 being rotatable relative to the sleeve 94, for example by ball bearings (not shown) between the shaft 92 and sleeve 94, to permit pivoting of the top rack 30 relative to the bearing housing 94 as it moves along the track structure 48. In addition a roller 90 extends from the housing 94 and is captured by flanges 96 within a rail or raceway structure 88 that extends along both the inclined edge 156 and horizontal top edge 154 of the track structure 48 to enable movement of the bearing 84, and therefore the top rack 20, along the top edges 154 and 156. In order to guide the top rack through a complete range of movement from the transporting position to the loading/unloading position, the bearing structures 84 are preferably situated near or at a front of the mounting rack, which faces a front of the vehicle to which the mounting rack is attached.

It will be appreciated that the illustrated details of the bearing 84 are exemplary in nature, and that various types of bearings and rail structures may be utilized.

Figure 2:
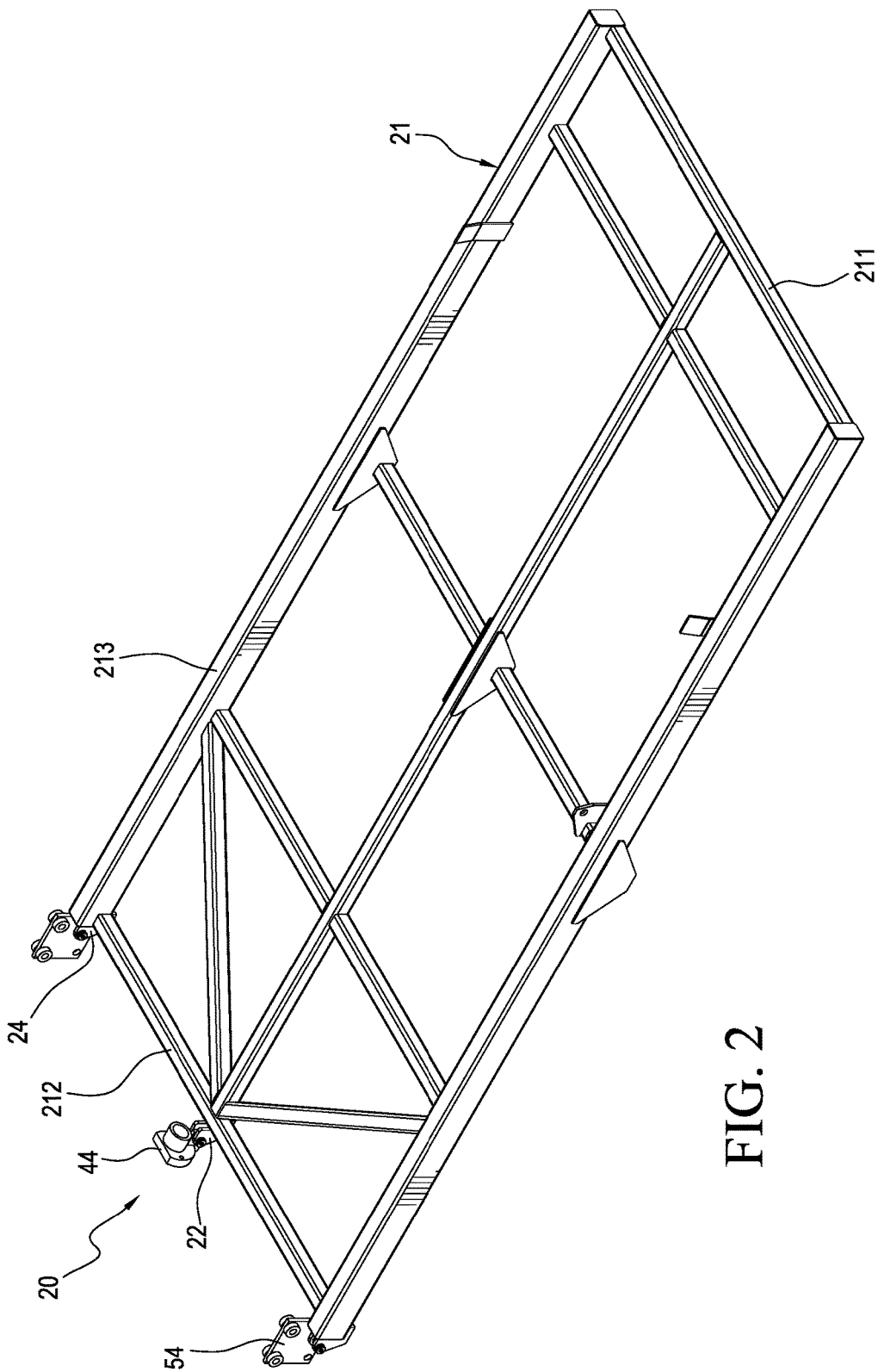
FIG. 2 is a perspective view of a mounting rack of the cargo loader of FIG. 1, shown without the tracks.

With reference to FIG. 2, the mounting rack 20 includes a mounting frame 21 defined by a front mount portion 211, an opposite rear mount portion 212, and two opposing lateral mount portions 213 provided between the front and rear mount portions and arranged parallel to each other. The mounting frame 21 is preferably a rectangular or square shape, and is configured to detachably mount to a vehicle, such as to the roof of a bus or truck. For instance, the mounting frame may be detachably secured to the roof of a vehicle using tie-down strap, clamp or other attachment device.

The mounting frame 21 includes a first pivot ear 22 and a pair of second pivot ears 24, wherein the first pivot ear 22 is centrally located on the rear mounting portion 212 between each of the second pivot ears 24. The mounting frame 21 further includes a support strut 25 located between the front and rear mount portions 211, 212 and having opposing ends respectively connected to the opposing lateral mount portions 213, such that the support strut is arranged parallel to the front and rear mount portions and perpendicular to the lateral mount portions. It should be appreciated that the mounting frame may further include additional struts connected between the various mounting portions of the mounting frame for providing increased structural integrity.

Figure 3:
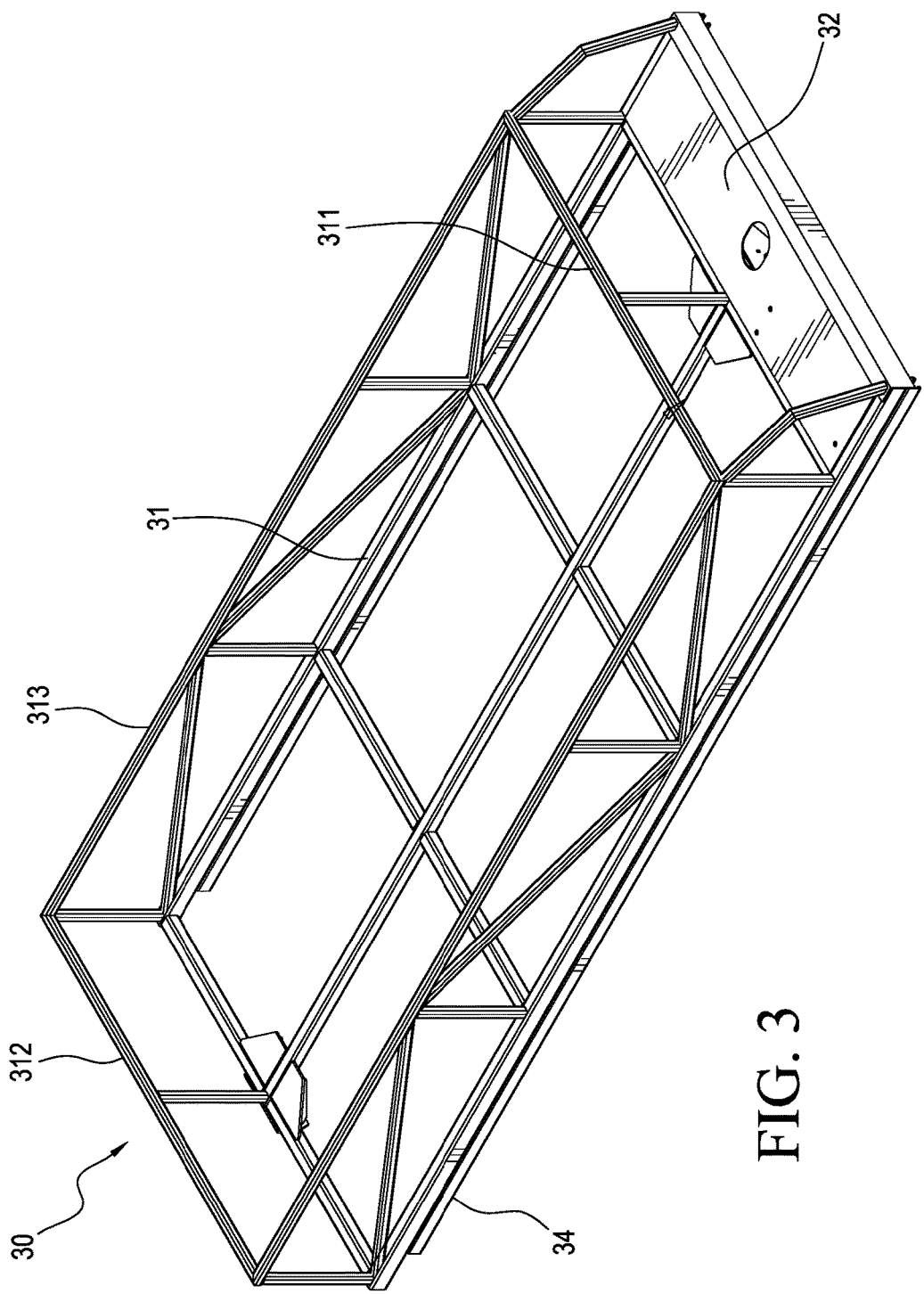
FIG. 3 is a perspective view of a top rack of the cargo loader of FIG. 1.

The top rack 30 is configured to receive cargo, such as bales of hay and other bulk materials, and is both slidably and pivotally connected to the mounting rack 20. Referring to FIG. 3, the top rack 30 includes a base frame 31 substantially corresponding to the mounting frame 21 of the mounting rack 20 in both shape and size. Extending in a upward direction from the base frame 21 are a front wall portion 311, an opposite rear wall portion 312, and two opposing lateral wall portions 313 joined to the front and rear wall portions to form a container for storing cargo. A wire mesh or grate may be provided within the base frame and wall portions that form the container so that cargo does not fall out during transport. It should be appreciated that the base frame and wall portions may include a plurality of additional struts and gussets for providing increased structural integrity. The top rack also comprises a mounting shelf 32 located adjacent to the front wall portion 311 on the base frame for housing a driving device.

The top rack 30 further comprises a pair of longitudinal guide rails 34 respectively provided along the bottom surface of each lateral side of the base frame 31. The pair of guide rails 34 is configured to slidably engage with a corresponding pair of trolleys 54 pivotally connected to the respective second pivot ears 24 of the mounting frame 21, such that top rack is both slidable and pivotable with respect to the mounting rack. Each trolley 54 includes a plate member 541 configured to pivotally engage with the respective second pivot ear 24, and at least one roller or wheel 542 configured to slidably engage an interior channel of the guide rail 34. In particular, the guide rails 34 define a substantially U-shaped cross-section having at least one inwardly extending, hook-shaped, flange for supporting the corresponding roller.

As illustrated in FIGS. 4 and 5, each guide rail 34 is mounted to the underside of the base frame 31 and includes an elongated opening defining a channel adapted to slidably receive the respective trolley 54. In particular, the longitudinal opening of the guide rail 34 includes at least one inwardly extending longitudinal flange for engaging the rollers 542 of the trolley.

The moving mechanism 40 is provided between the top rack and the mounting rack, and comprises a linear actuator 42, a threaded pivot collar 44, and at least one damping member 46. The linear actuator comprises a driving device 421, such as an electric motor, and an elongated threaded screw rod 422 having a first end and an opposite second end. The first end of the screw rod 422 is rotatably connected to the driving device and the second end of the screw rod is rotatably connected to a support collar 35, such as a bearing member, mounted to the bottom surface of the rear end of the top rack. The screw rod 422 is provided below the top rack and has a length extending from the driving device to the support collar. The threaded pivot collar 44 is pivotally connected to the first pivot ear 22 of the mounting rack and is configured to correspondingly engage the threaded screw rod between the first and second ends thereof. The driving device may be attached to either a top surface or a bottom surface of the mounting shelf 32, and is adapted to rotate the screw rod 422.

It will be appreciated by those skilled in the art that the moving mechanism is not limited to the illustrated screw and follower type actuator or to an electric motor driven mechanism, but rather may include an actuator capable of moving the top rack 30 relative to the mounting rack 20, including rack and pinion or winch mechanisms, and arrangement that utilize pneumatic or hydraulic actuators. Also, although the track structures 48 securely guide the movement of the top rack 30 relative to the mounting rack 20, it is possible to add damping mechanisms or arrangements, as well as safety brakes, latches or the like. Control of the electric motor or other actuator may include an automatic stop feature in which actuation requires the operator to actively manipulate a control lever or the like, and in which movement is halted whenever the operator stops actively manipulating the control device.

The cargo loader may be moved from a transporting position as shown in FIG. 6 to a loading/unloading/unloading position as shown in FIG. 8. In operation, the driving device 421 turns the elongated screw rod 422 in a first rotating direction. The pivot collar 44 is pivotally connected to the first pivot ear 22 on the rear end of the mounting rack and is configured to guide the elongated screw rod. The pivot collar 44 threadedly engages the screw rod such that as the driving device turns the screw rod, it moves through pivot collar and causes the top rack to correspondingly slide along the stationary mounting rack in the rearward direction. In particular, each trolley 54 is pivotally connected to a respective second pivot ear 24 of the mounting rack and slidably engages the guide rail 34 of the top rack. As the top rack moves toward an intermediate adjustment position, as shown in FIG. 7, the top rack 30, guiding by the track structure 48, pivots away from the mounting rack 20 towards the loading/unloading/unloading position. Once the top rack is loaded, the driving device turns the screw rod in a second opposite rotating direction in order to retract the top rack back to its original transporting position.

Figure 9:
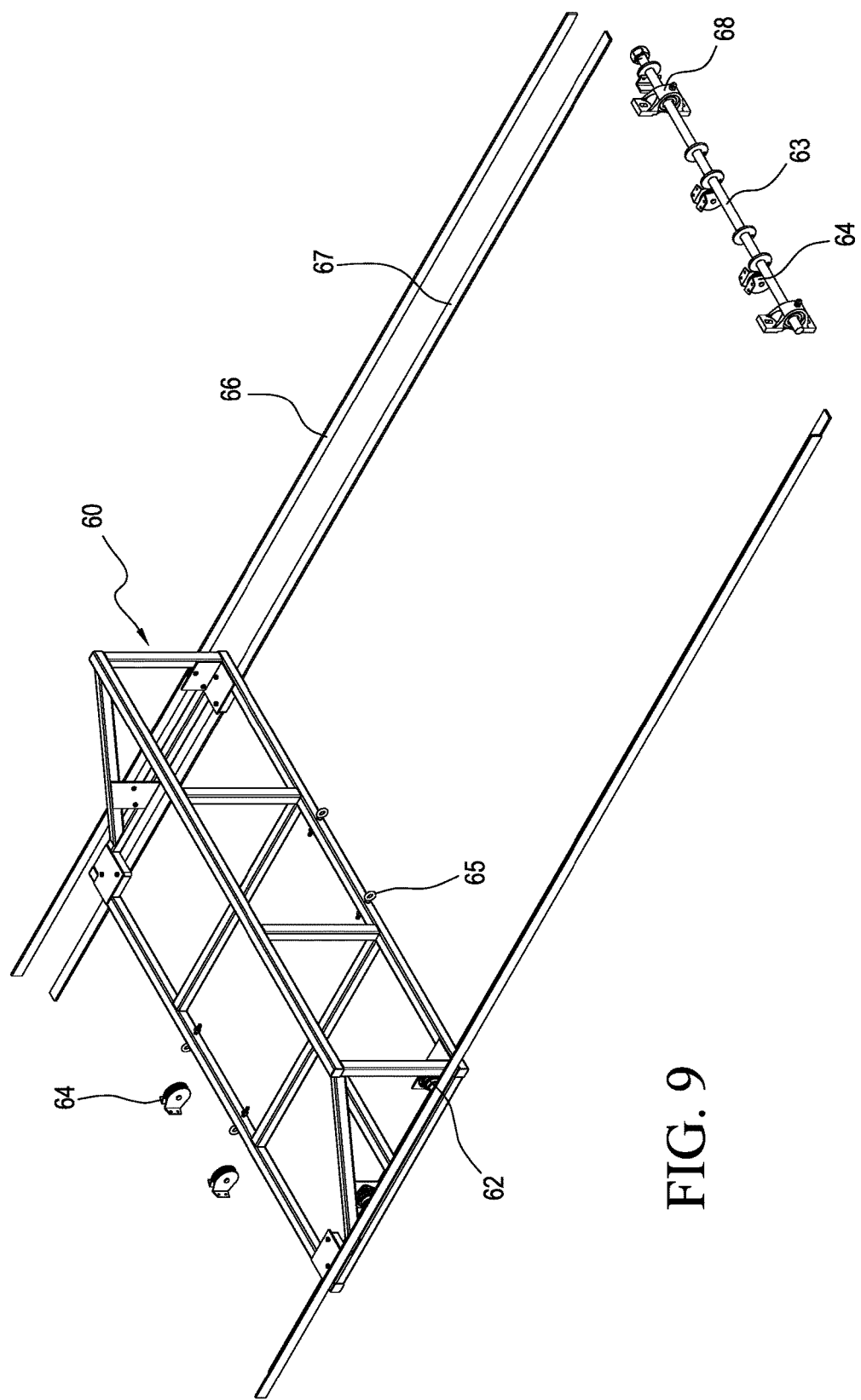
FIG. 9 is an exploded perspective view of a shelf unit for the cargo loader according to the present invention.

In a variation of the cargo loader of the present invention, the top rack further comprises a shelf unit 60 which assists with loading and unloading cargo as shown in FIG. 9. The shelf unit 60 includes a movable shelf frame configured to slide between the rear end of the top rack and the front end of the top rack. The base frame 31 of the top rack includes a first shelf guide 66 and a second shelf guide 67 provided on each lateral side of top rack for guiding the slidable shelf frame. A set of rollers 62 are provided on opposing lateral sides of the shelf frame and are arranged to roll along the corresponding first and second shelf guides for slidably moving the shelf frame along the top rack.

A support bar 63 is attached to the rear end of the top rack by at least one mounting bracket 68. At least one pulley 64 is fixed on the support bar and includes a cable engaged to a corresponding hook 65 fixed on the rear end of the shelf frame for selectively pulling the shelf frame toward the rear end of the top rack. The at least one pulley may also be fixed to the front end of the top rack and includes a cable engaged to a corresponding hook fixed on the front end of the shelf frame for selectively pulling the shelf frame toward the front end of the top rack.

Figure 10:
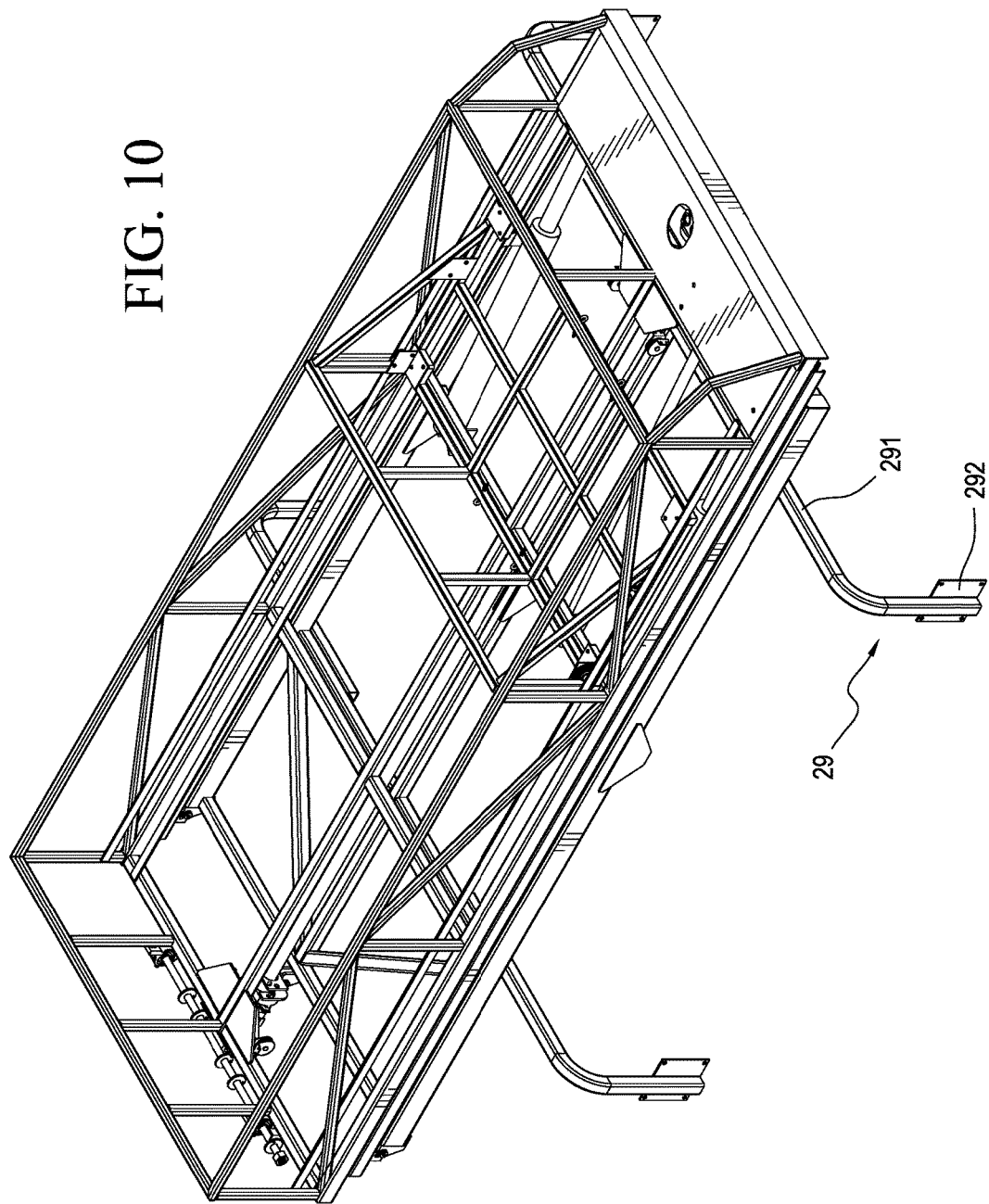
FIG. 10 is a perspective view of a cargo loader having the shelf unit shown in FIG. 9.

A variation of the mounting frame may further include a plurality of attachment members 29 as shown in FIG. 10. Each attachment member 29 includes a first attachment portion 291 attached to the mounting frame and a second attachment portion 292 configured to attach to a vehicle, such as the side of a bus or truck. In particular, the first attachment portion is substantially perpendicularly connected to the second attachment portion by a curved elbow portion. Thus, the first attachment portion is configured to extend laterally across the top of the vehicle, and the second attachment portion is configured to extend downward along the side of the vehicle. The second attachment portion further includes an engaging member configured to directly secure to a vehicle. The engaging member may be a plate having a plurality of bolt insertion holes for bolting the engaging member directly to a side of the vehicle, thus securing the entire cargo loader to the roof of the vehicle.

Various other modifications and changes will be apparent to those of ordinary skill in the art without departing from the spirit and scope of the present invention. Applicant intends that these variations and modifications are included as part of the present invention and are not intended to limit the scope of the invention. Applicant does not intend the present application to be limited to only those embodiments outlined above or shown in the figures since features shown in particular embodiments may be incorporated into other embodiments. The present application is intended to cover such alternatives, modifications, and equivalents as may be included within the spirit and scope of the invention as defined by the appended claims.

What is claimed is:

1. A loading and unloading apparatus comprising:
   a mounting rack configured to removably attach to a roof of a vehicle, and including a mounting frame defining a first plane and having a front mount portion, a rear mount portion, and a pair of opposing lateral mount portions;
   a track structure extending upwardly from respective opposite lateral sides of the mounting rack, the track structure including a pair of upwardly extending trapezoidal structures, each having a front edge, a rear edge, a bottom edge extending from the front edge to the rear edge of a respective trapezoidal structure, a horizontal top edge extending parallel to the bottom edge from the rear edge to a intersection point between the front and rear edges of the respective plate, and an inclined edge extending from the intersection point to the front edge of the respective trapezoidal structure;
   a top rack slidably and pivotally connected to the mounting rack, and including a base frame defining a second plane and having a front wall portion, a rear wall portion and a pair of opposing lateral wall portions defining a container space for storing cargo;
   a bearing structure extending from respective opposite lateral sides of the top rack, adjacent a front of the top rack, and arranged to cooperate with the track structure to guide the top rack relative to the mounting rack as the bearing structure is moved rearwardly along the inclined edge from the front edge to the intersection point, and then rearwardly along the horizontal top edge from the intersection point to the rear edge, from a transporting position in which the respective first and second planes of the mounting frame and the base frame are substantially parallel to a loading/unloading position in which the second plane of the base frame is slanted and lowered with respect to the first plane of the mounting frame;
   a pivot ear fixed to the rear edge of each of the trapezoidal track structures and a trolley pivotally connected to each of the pivot ears and slidably coupled to the top rack,
   a moving mechanism adapted to move the top rack relative to the stationary mounting rack from the transporting position to the loading position and back as the top rack is pivoted about said pivot ears as the pair of trolleys slides along a bottom of the top rack and the top rack is further guided by movement of the bearing structure relative to the trapezoidal track structure along the inclined edge and the horizontal top edge of each of the upwardly extending trapezoidal structures.

2. The loading and unloading apparatus according to claim 1, wherein the trapezoidal structures each includes an upwardly extending plate, a respective raceway extending along the inclined and top edges of the trapezoidal structure, and a flange for capturing a roller included in the bearing structure.

3. The loading and unloading apparatus according to claim 2, wherein the bearing structure includes a shaft fixed to the top rack, a relatively rotatable sleeve to allow pivoting of the top rack relative to the track structure and mounting rack, and said roller extending downwardly from a housing of the bearing structure can captured within said raceway.

4. The loading and unloading apparatus according to claim 1, wherein the mounting frame further includes a third pivot ear provided on the rear mount portion, wherein the third pivot ear is located between the pivot ears fixed to the rear edge of the each of the trapezoidal track structures.

5. The loading and unloading apparatus according to claim 4, wherein the moving mechanism comprises a linear actuator, and a threaded pivot collar pivotally connected to the first pivot ear of the mounting rack.

6. The loading and unloading apparatus according to claim 5, wherein the linear actuator comprises a driving device and an elongated threaded screw rod threadedly engaged to the threaded pivot collar and having a first end and an opposite second end, wherein the first end of the screw rod is rotatably connected to the driving device and the second end of the screw rod is rotatably connected to a support collar mounted to the rear end of the top rack.

7. The loading and unloading apparatus according to claim 6, wherein the driving device is adapted to rotate the screw rod, and wherein the screw rod is located between the top rack and the mounting rack and has a length extending from the driving device to the support collar.

8. The loading and unloading apparatus according to claim 6, wherein the support collar is a bearing member.

9. The loading and unloading apparatus according to claim 6, wherein the top rack further includes a mounting shelf adjacent to the front wall portion on the base frame and configured to house the driving device.

10. The loading and unloading apparatus according to claim 6, wherein the driving device is an electric motor.

11. The loading and unloading apparatus according to claim 6, wherein each of the trolleys includes a plate member and at least one roller.

12. The loading and unloading apparatus according to claim 11, wherein the top rack further comprises a pair longitudinal guide rails configured to engage the respective pair of trolleys, wherein the each of the pair of guide rails is oppositely spaced apart on lateral sides of the base frame.

13. The loading and unloading apparatus according to claim 12, wherein the pair of guide rails include a longitudinal opening having at least one inwardly extending flange configured to receive the at least one roller of the respective pair of trolleys.

* * * * *